United States Patent
Borse et al.

(10) Patent No.: US 9,931,886 B2
(45) Date of Patent: Apr. 3, 2018

(54) ARTIST PALETTE AND METHOD OF MAKING SAME

(71) Applicants: Joseph Borse, Chicago, IL (US); Michael Borse, Western Springs, IL (US); Robert J. Borse, Plainfield, IL (US)

(72) Inventors: Joseph Borse, Chicago, IL (US); Michael Borse, Western Springs, IL (US); Robert J. Borse, Plainfield, IL (US)

( * ) Notice: Subject to any disclaimer, the term of this patent is extended or adjusted under 35 U.S.C. 154(b) by 231 days.

(21) Appl. No.: 14/862,986

(22) Filed: Sep. 23, 2015

(65) Prior Publication Data

US 2017/0080746 A1    Mar. 23, 2017

(51) Int. Cl.
  *B44D 3/02*    (2006.01)
  *B29C 51/26*    (2006.01)
  *B29L 31/00*    (2006.01)
  *B29C 51/10*    (2006.01)

(52) U.S. Cl.
  CPC ............. *B44D 3/02* (2013.01); *B29C 51/264* (2013.01); *B29C 51/10* (2013.01); *B29L 2031/00* (2013.01); *B29L 2031/7178* (2013.01)

(58) Field of Classification Search
  CPC . B44D 3/003; B44D 3/02; B44D 3/04; B44D 3/123; B44D 3/126; A47G 19/06; A47G 19/065; A47G 23/06; B65D 1/34; B65D 1/36
  USPC .......... 206/1.7–1.8, 562, 564–565, 575, 815; 220/556, 575, 735, 737; D19/77, 103, D19/120; D7/543, 549, 553.1, 553.5, D7/553.8, 554.2, 555
  See application file for complete search history.

(56) References Cited

U.S. PATENT DOCUMENTS

| | | | | |
|---|---|---|---|---|
| 748,026 | A | * 12/1903 | Sussmilch | B44D 3/02 188/153 R |
| 1,484,613 | A | * 2/1924 | Carmel | B44D 3/02 206/1.7 |
| 1,662,077 | A | * 3/1928 | Schwartz | B43M 99/00 211/69.1 |
| D150,279 | S | * 7/1948 | Wies | 132/73 |
| D184,597 | S | 3/1959 | Berman | |
| 3,650,589 | A | * 3/1972 | Linger | B44D 3/04 206/1.7 |
| 3,815,265 | A | 6/1974 | DePauw | |

(Continued)

FOREIGN PATENT DOCUMENTS

| | | |
|---|---|---|
| CN | 203766388 | 8/2014 |
| FR | 1494129 | 9/1967 |

(Continued)

*Primary Examiner* — Chun Cheung
*Assistant Examiner* — Brijesh V. Patel
(74) *Attorney, Agent, or Firm* — McDonnell Boehnen Hulbert & Berghoff LLP

(57) ABSTRACT

An artist palette having a tray with an upper surface, a plurality of recessed wells positioned in the tray, an aperture in an edge of the upper surface of the tray providing a place for a painter to hold the tray, a drip ledge groove positioned on a periphery of the upper surface of the tray including a first upwardly extending edge useful for removing excess paint and water from a paintbrush, and wherein the drip ledge groove serves to hold paint or water that has been removed from the paintbrush.

19 Claims, 7 Drawing Sheets

(56) References Cited

U.S. PATENT DOCUMENTS

| | | | |
|---|---|---|---|
| 3,945,490 A * | 3/1976 | Thompson | B44D 3/02 206/1.7 |
| D277,295 S * | 1/1985 | Jones | D19/106 |
| 4,573,586 A | 3/1986 | Helmer | |
| D300,540 S * | 4/1989 | Salis | D19/106 |
| D304,512 S | 11/1989 | Byers et al. | |
| 4,911,642 A | 3/1990 | Knowles | |
| 5,100,324 A * | 3/1992 | Slayton | A45C 11/36 101/127.1 |
| 5,209,664 A | 5/1993 | Wilcox | |
| 5,277,302 A * | 1/1994 | Seisa | B44D 3/02 206/1.8 |
| 5,310,076 A * | 5/1994 | Burton | H05K 7/023 206/719 |
| D362,018 S * | 9/1995 | Damm | D19/103 |
| 5,607,077 A * | 3/1997 | Torkelson | A47G 19/065 206/217 |
| 5,992,912 A * | 11/1999 | Zimm | A45D 29/20 206/1.7 |
| 6,651,836 B1 * | 11/2003 | Hofheins | A47G 19/06 206/562 |
| 8,746,456 B1 * | 6/2014 | Bradley | B65D 1/34 206/562 |
| D712,204 S * | 9/2014 | Hatcher | D7/553.5 |
| D778,116 S * | 2/2017 | Cao | D7/554.2 |
| 2001/0031136 A1 | 10/2001 | Kawamura et al. | |
| 2008/0116084 A1 | 5/2008 | Nelson | |
| 2009/0321282 A1 | 12/2009 | Asmaro | |
| 2011/0174680 A1 * | 7/2011 | Arvin | A45D 33/00 206/581 |
| 2012/0234717 A1 * | 9/2012 | Kirkland | B65D 1/36 206/488 |

FOREIGN PATENT DOCUMENTS

| | | |
|---|---|---|
| FR | 2728508 | 6/1996 |
| GB | 477803 | 1/1938 |

\* cited by examiner

US 9,931,886 B2

ARTIST PALETTE AND METHOD OF MAKING SAME

BACKGROUND

The present application generally relates to the field of artist palettes. More particularly, the present application relates to an artist palette that may be thermoformed or injection molded, as well as a method of forming an artist palette.

An artist palette, also referred to as an art palette, may take the form of a flat handheld board or tray onto which different colors of paint may be placed to allow a painter to have a number of different colors of paint to choose from, and to allow the painter to mix different colors of paint together on the handheld tray to form a different color of paint. Art palettes may be used by painters as a place to position paint on the handheld board or tray which is held in one hand while a paint brush is held in the other hand.

SUMMARY

In one aspect, an artist palette is formed using a thermoforming or injection molding process. Using such a process allows the artist palette to be formed as a single integral unit, and allows for mass production of the artist palette. In addition, a thermoformed artist palette may be designed such that the artist palettes are easily stacked in a nesting relationship which provides for easy shipping and packaging. The art palette may include a tray with an upper surface, a plurality of recessed wells positioned in the tray, an aperture in an edge of the upper surface of the tray providing a place for a painter to hold the tray, a drip ledge groove positioned on a periphery of the upper surface of the tray including a first upwardly extending edge useful for removing excess paint and water from a paintbrush, and wherein the drip ledge groove serves to hold paint or water that has been removed from the paintbrush by the upwardly extending edge. The art palette may further include one or more slots positioned in the tray adapted to hold a paintbrush. The slots may be formed as a pair of intersecting slits like a straw slot on a soft drink lid. The art palette may be made from environmentally friendly material that may be recycled, and the art palette is also advantageously reusable, and eventually disposable where it may be recycled.

In another aspect, an artist palette is provided including a tray having an upper surface, a plurality of recessed wells positioned in the tray, an aperture in an edge of the upper surface of the tray providing a place for a painter to hold the tray, one or more slots positioned in the tray adapted to hold a paintbrush, and a drip ledge groove positioned on a periphery of the upper surface of the tray including a first upwardly extending edge useful for removing excess paint and water from a paintbrush.

In a further aspect, an artist palette is provided including a tray having an upper surface, a plurality of recessed wells positioned in the tray, an aperture in the upper surface of the tray providing a place for a painter to hold the tray, a drip ledge groove positioned on a periphery of the upper surface of the tray including a first upwardly extending edge useful for removing excess paint or water from a paintbrush, and wherein the drip ledge groove serves to hold paint or water that has been removed from the paintbrush.

In yet a further aspect, a method for thermoforming an art palette is provided, with the art palette having an upper surface, a plurality of recessed wells positioned in the tray, an aperture in the upper surface of the tray providing a place for a painter to hold the tray, a drip ledge groove positioned on a periphery of the upper surface of the tray including a first upwardly extending edge useful for removing excess paint or water from a paintbrush, including the steps of (i) forming a tray having an upper surface in a sheet of plastic; (ii) forming a plurality of recessed wells positioned in the tray; (iii) providing an aperture in the upper surface of the tray that provides a place for a painter to hold the tray; (iv) forming a drip ledge groove on a periphery of the upper surface of the tray that includes a first upwardly extending edge useful for removing excess paint or water from a paintbrush; and (v) wherein the drip ledge groove serves to hold paint and water that has been removed from the paintbrush.

BRIEF DESCRIPTION OF THE DRAWINGS

Exemplary embodiments of the invention are described herein with reference to the drawings, wherein like parts are designated by like reference numerals, and wherein.

DETAILED DESCRIPTION

The present embodiments shown in FIGS. 1-7B below are directed to an artist palette that may be advantageously formed using a thermoforming or injection molding process. Thermoforming has been used to mass produce plastic parts including packaging for food products. A sheet of thermoplastic material or other plastic material is positioned over one or more mold cavities. In some instances a vacuum is used to draw the thermoplastic or plastic into the mold cavities, and in other instances a positive pressure may be used to force the thermoplastic or plastic material into the mold cavities.

Furthermore, rotary thermoforming of parts has also been used where an extruded sheet of thermoplastic or plastic material is fed over the surface of a rotatory drum which contains a series of mold cavities on the outer surface of the drum. The material within each of the mold cavity cools as the drum rotates and is eventually removed from the mold cavity as a formed part, where it may undergo further processing steps in some instances.

Accordingly, it would be desirable to provide an artist palette through a thermoforming or injection molding process. Using such a process allows the artist palette to be formed as a single integral unit, and allows for mass production of the artist palette. In addition, a thermoformed artist palette may be designed such that the artist palettes are easily stacked in a nesting relationship which provides for easy shipping and packaging. The artist palette may be formed using the thermoforming apparatus and methods disclosed in pending U.S. patent application Ser. No. 14/631,369 filed Feb. 25, 2015 and entitled "Rotary Thermoforming Apparatus and Method of Using Same," herein incorporated by reference.

The artist palette made be made from a thermoformable or injection moldable plastic. For example, artist palette could be formed using polyethylene, polypropylene, polyethylene terephthalate (PET), or recycled PET (rPET). The use of these materials is environmentally friendly because they can be recycled. In addition, a chemical resistant material of coating of chemical resistant material may be applied to the art palette to protect against certain types of corrosive paints. In addition, the art palette may be reusable, and ultimately may be easily disposed of where it may be recycled.

Figure 1:
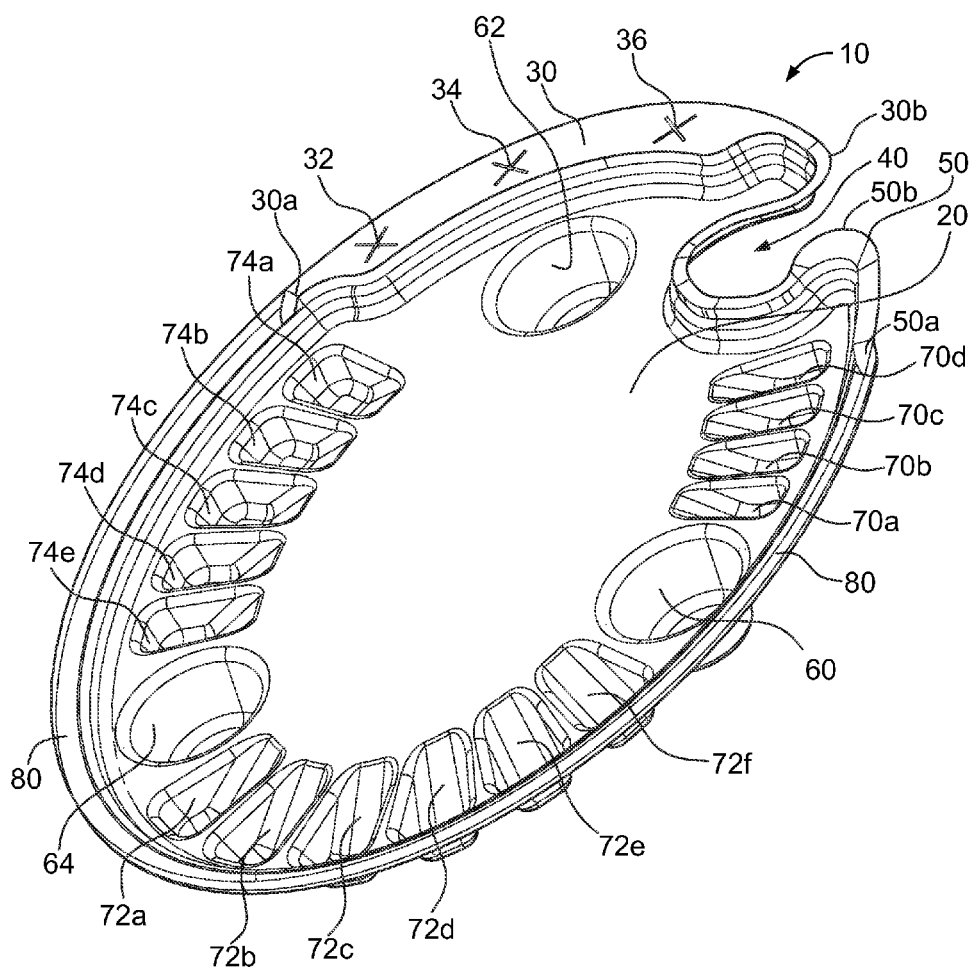
FIG. 1 is a perspective top view of artist palette 10.

FIG. 1 is a perspective top view of artist palette 10 that may be advantageously formed using a thermoforming or injection molding process. Artist palette 10 takes the form of a tray that includes an upper surface 20 that may be used to mix different colored paints together. Artist palette 10 further includes a plurality of recessed wells 70a-d, 72a-f, and 74a-e of varying sizes that may be used as paint wells, and separate different colors of paint as a different color of paint may be placed in each of the recessed wells. In addition, art palette 10 includes a plurality of recessed water wells 60, 62, and 64 which may be used to hold water to clean off paintbrushes or dilute paint, which are particularly useful when working with watercolor paints, although art palette 10 may be also be used with other types of paint such as oil or acrylic paints. Although a plurality of water wells are shown, a single water well or additional water wells could also be provided. Art palette 10 further includes an aperture 40 positioned between points 30b and 50b to provide a place for an artist to hold the art palette 10. Further, although not shown, a hole could be provided on upper surface 20 to provide a place for an artist's thumb to extend through to further aid in holding art palette 10.

Art palette 10 further includes a raised section 30 on the periphery of upper surface 20 that includes slots 32, 34, and 36 that may be used to hold paintbrushes. Slots 32, 34, and 36 may take the form of a pair of intersecting slits, similar to the straw slot found on the plastic lid of soft drink cups. Art palette 10 also advantageously includes a drip ledge groove 80 having edges that can be used to remove excess paint or water from a paintbrush. As shown in FIG. 1, drip ledge groove 80 may extend from downwardly sloping wall 30a of section 30 to downwardly sloping wall 50a extending from section 50 of art palette 10. In addition, drip ledge groove 80 may be downwardly sloped and drain into one or more of the plurality of recessed wells, such as recessed wells 72a-f, to channel or drain water and/or paint removed by the edges of drip ledge groove 80. Further details of drip ledge groove 80 are shown and described with reference to FIG. 7B below.

Figure 2:
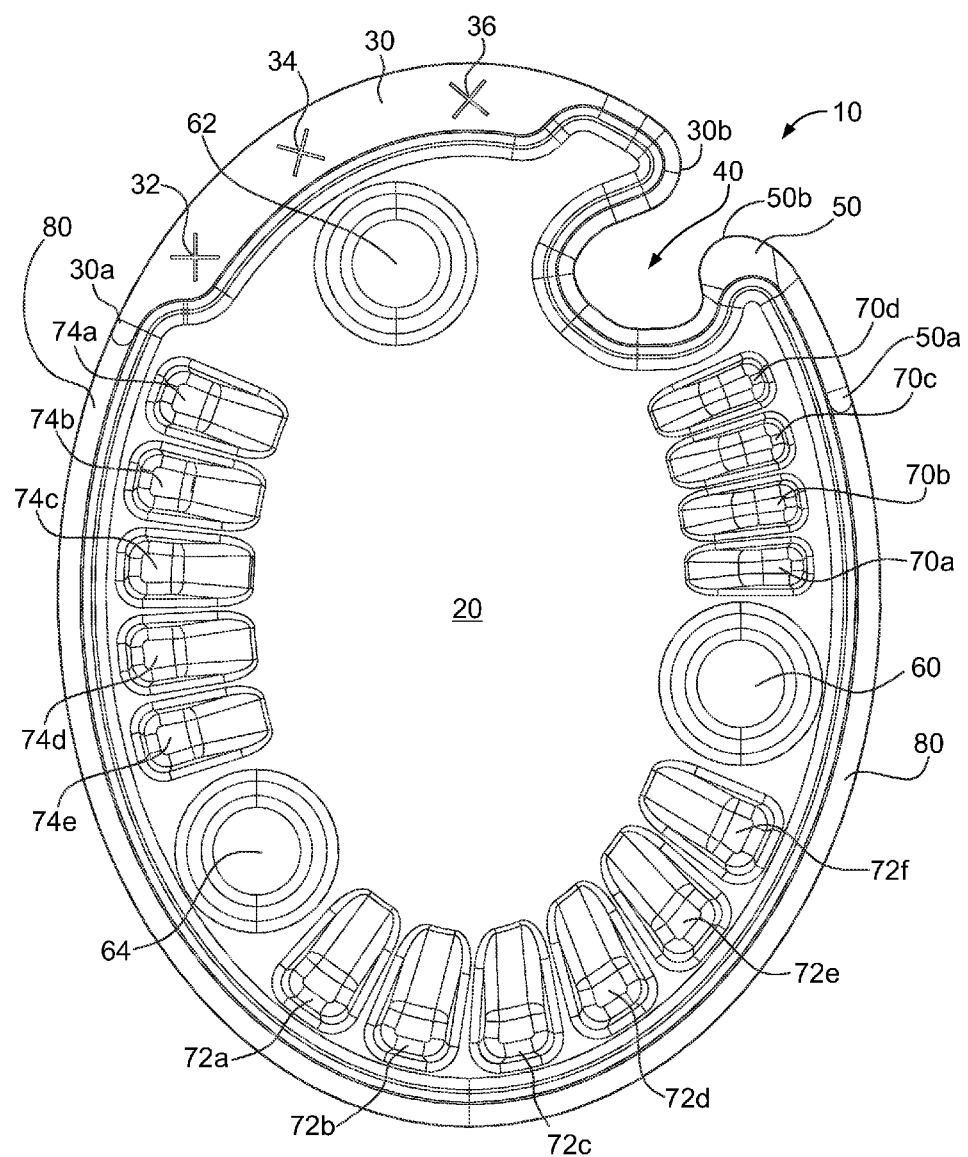
FIG. 2 is a top view of the artist palette 10 shown in FIG. 1.

FIG. 2 is a top view of the artist palette 10 shown in FIG. 1. Recessed wells 70a-d are shown with each having the same configuration and depth. Larger recessed wells 74a-e are shown with each having the same configuration and depth. Even larger recessed wells 72a-f are shown with each having the same configuration and depth. The largest recessed wells 72a-f may be used for more commonly used paints depending on the particular painting being painted, and smallest recessed wells 70a-d may be used for less commonly used paints. However, recessed wells 70a-d, 72a-f, and 74a-e could all have the same configuration and depth, or all have different configurations and depths. Recessed wells 60, 62, 64 may be used to hold water that may be used to clean paintbrushes or dilute paint. Recessed wells 60, 62, and 64 are shown with the same depths and configurations, but they could all be different as well.

Slots 32, 34, and 36 may be used to hold paintbrushes or other items, such as a pencil. In the embodiment shown, slots 32, 34, and 36 are shown as a pair of intersecting slits, like a straw slot found on plastic soft drink lids. However, slots 32, 34, and 36 could be formed with only a single slit, or with additional slits, and may include a hole at the center. Slots 32, 34, and 36 could also be formed with three slits that extend to a central portion of the slot where the slits meet each other.

Aperture 40 is shown positioned between edges 30b and 50b, where the palm of a painter's hand may be inserted to hold the art palette 10. Drip ledge groove 80 extends from downwardly sloping wall 30a to downwardly sloping wall 50a. However, the drip ledge groove 80 could be formed of separate sections around the periphery of the upper surface 20. As noted above, the drip ledge groove 80 (or grooves) could be downwardly sloped to channel paint and/or water removed from a paintbrush towards and into one of more of the recessed wells 70a-d, 72a-f, or 74a-e to allow for such water and paint to be collected to help prevent drip ledge groove 80 from becoming overfilled.

Art palette 10 is shown with a generally round or oval shape in the present embodiments. However, other geometries such as square, rectangular, or other shapes may also be used.

Figure 3:
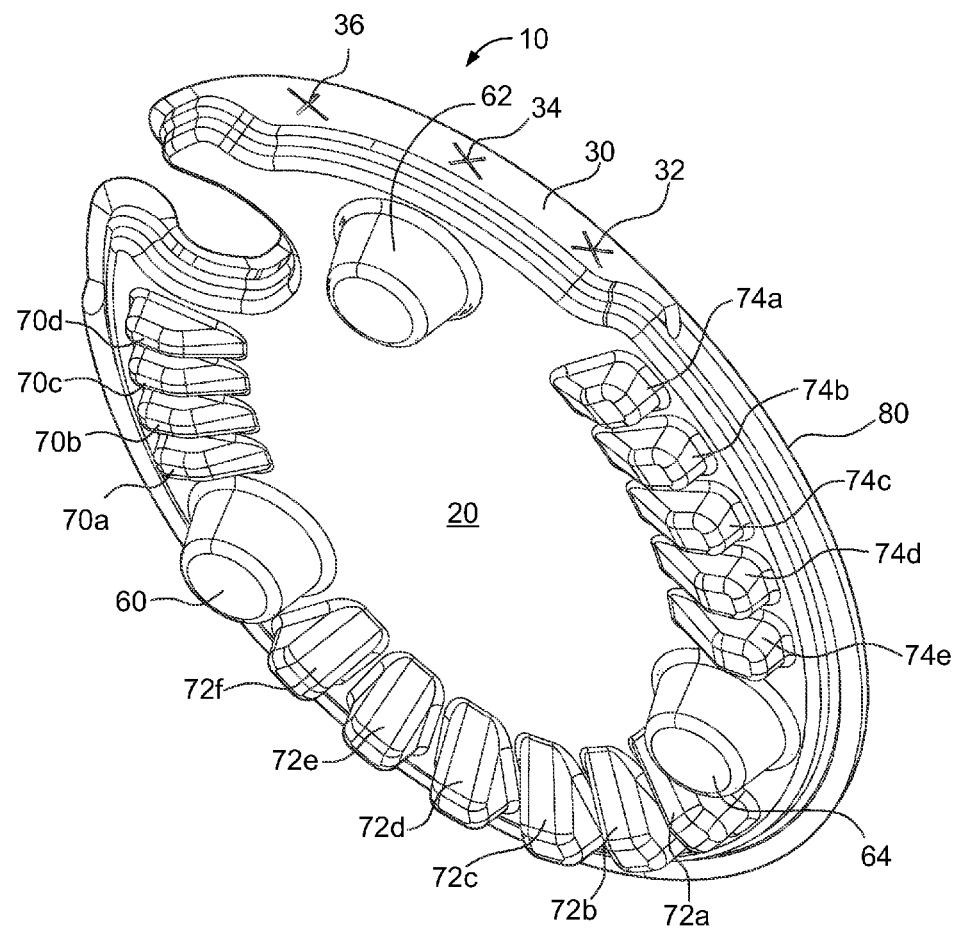
FIG. 3 is a perspective bottom view of the artist palette 10 shown in FIGS. 1 and 2.

FIG. 3 is a perspective bottom view of the artist palette 10 shown in FIGS. 1 and 2. The bottoms of recessed wells 70a-d are shown with each having the same configuration and relatively shallow depth. The bottoms of recessed wells 74a-e are shown with each having the same configuration and slightly deeper depth than recessed wells 70a-d. The bottoms of recessed wells 72a-f are shown with each having the same configuration and depth. The largest recessed wells 72a-f each have a greater depth than recessed wells 70a-d and 74a-e. However, recessed wells 70a-d, 72a-f, and 74a-e could all have the same configuration and depth, or all have different configurations and depths. The bottoms of recessed wells 60, 62, 64 are also shown that may be used to hold water that may be used to clean paintbrushes or dilute paint. Recessed wells 60, 62, and 64 are shown with the same depths and configurations, but they could all have different configurations and depths as well.

The bottom of slots 32, 34, and 36 are shown in section 30 of tray 20 which may be used to hold paintbrushes or other items, such as a pencil, and there is a clearance beneath section 30 to allow for paintbrushes to extend beneath slots 32, 34, and 36. In the embodiment shown, there are three slots 32, 34, and 36, although fewer or additional slots could also be provided. Bottom of drip ledge groove 80 is also shown extending around the periphery of tray 20.

Figure 4:
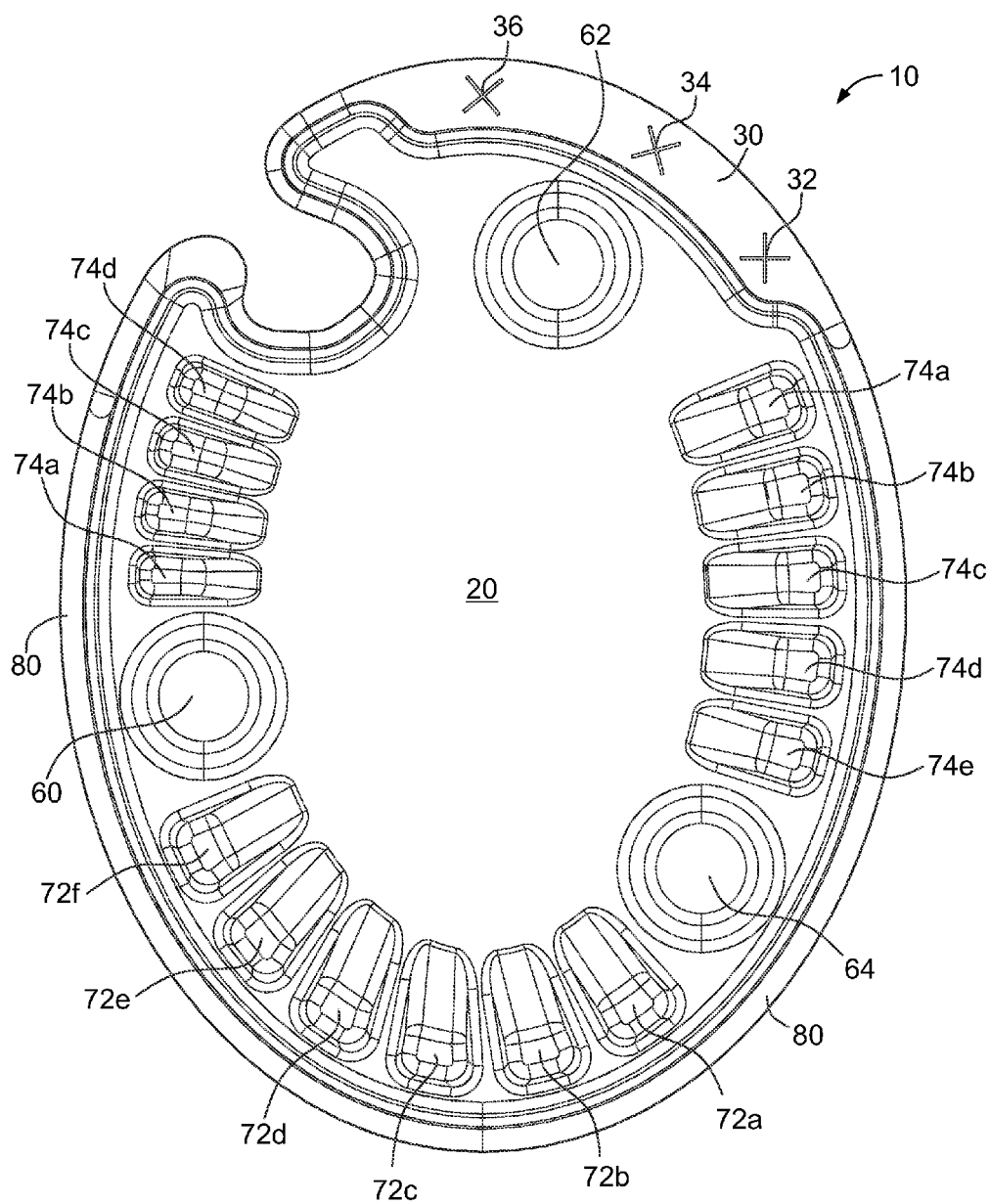
FIG. 4 is a bottom view of art palette 10 shown in FIGS. 1-3.

FIG. 4 is a bottom view of art palette 10 shown in FIGS. 1-3. The bottoms of recessed wells 70a-d, 74a-e, and 72a-f are shown with each having the same configuration and depth. The bottoms of recessed wells 60, 62, and 64 are shown as well. In the embodiments shown, the positioning of the recessed wells 70a-d, 74a-e, and 72a-f are shown in a particular orientation with respect to each other, i.e., recessed well 64 positioned between recessed wells 74a-e and 72a-f, and recessed well 60 positioned between recesses wells 72a-f and 74a-d. However, the recessed wells can be positioned in any desired orientation with respect to each other. The bottom of drip ledge groove 80 is also shown extending around the periphery of tray 20.

Figure 5:
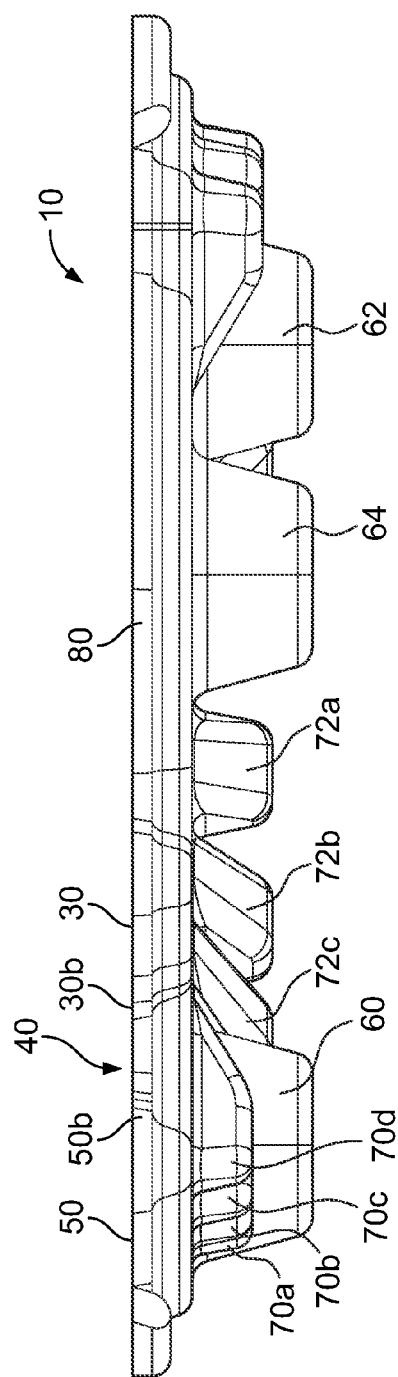
FIG. 5 is a side view looking towards the front of art palette 10 shown in FIGS. 1-4.

FIG. 5 is a view looking towards the front side of art palette 10 (looking towards the side with aperture 40) shown in FIGS. 1-4. The relative depths of recessed wells 60, 62, and 64 in comparison to recessed wells 72*a-c* and 70*a-d* is shown. The side of drip ledge groove 80 is also shown along with the aperture 40 extending between end 50*b* of section 50 and end 30*b* of section 30.

Figure 6:
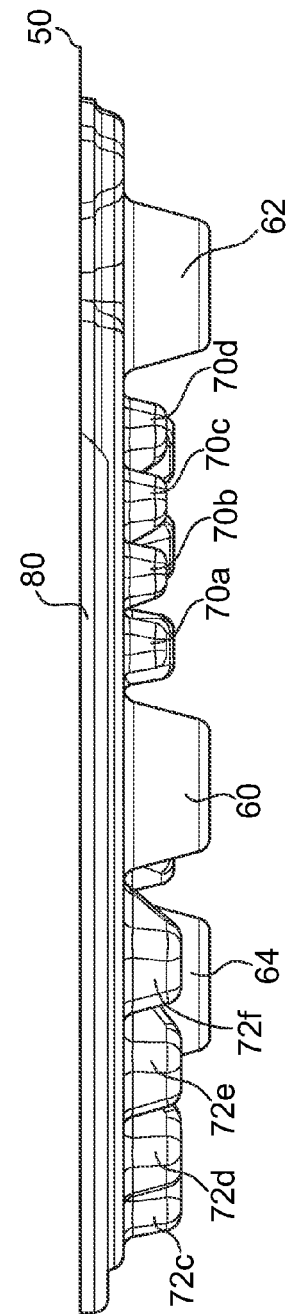
FIG. 6 is a right side view of the art palette 10 shown in FIGS. 1-5.

FIG. 6 is a view looking towards the right side of the art palette 10 (looking towards the side with recessed well 60) shown in FIGS. 1-5. The relative depths of recessed wells 60, 62, and 64 in comparison to recessed wells 72*c-f* and 70*a-d* is shown. The side of drip ledge groove 80 is also shown along with an extending edge of section 50.

Figures 7A, 7B:
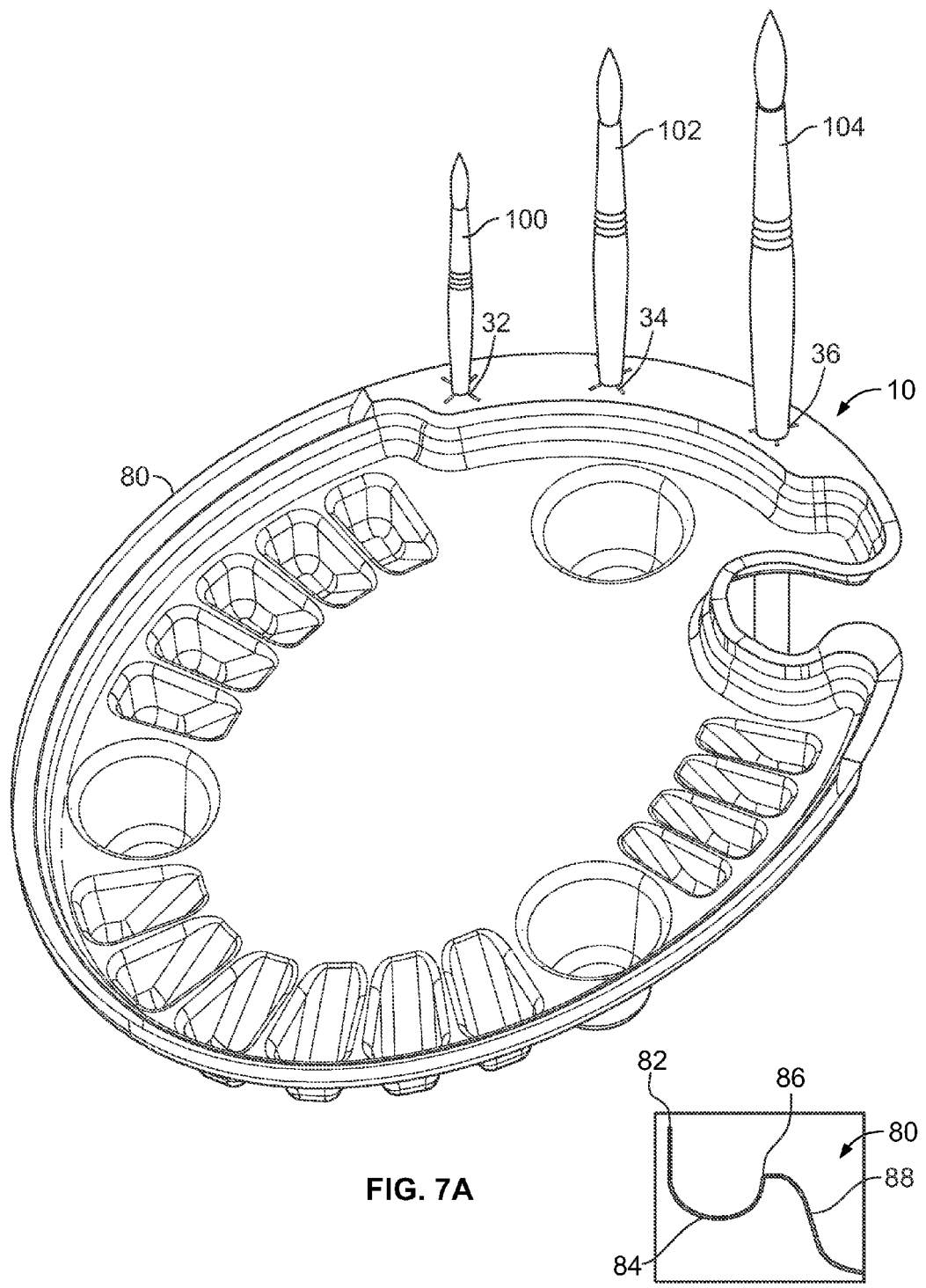
FIG. 7A is a perspective top view of art palette 10 shown in FIGS. 1-6 with paintbrushes 100, 102, and 104 positioned within slots 32, 34, and 36.
FIG. 7B is a cross-sectional view of drip ledge groove 80 of art palette 10 shown in FIGS. 1-7A.

FIG. 7A is a perspective top view of art palette 10 shown in FIGS. 1-6 with paintbrushes 100, 102, and 104 positioned within slots 32, 34, and 36. Slots 32, 34, and 36 allow for the positioning of different sized paintbrushes positioned therein. For example, slot 32 houses smaller paintbrush 100 whereas slot 36 houses largest paintbrush 104. It is also possible that the slots of 32, 34, and 36 or additional slots could be of different smaller or larger sizes to accommodate a greater range of paintbrush sizes. Slots 32, 34, and 36 allow a painter to have a variety of different sized paintbrushes housed within artist palette 10 to provide the painter with a greater range of paintbrush options that may be needed for a particular painting. In this embodiment, drip ledge groove 80 is shown extending around the periphery of art palette 10.

FIG. 7B is a cross-sectional view of drip ledge groove 80 of art palette 10 shown in FIGS. 1-7A. Drip ledge groove 80 is positioned on a periphery of upper surface 20 of the tray and may include a first upwardly extending edge 82 that that terminates at its end. First upwardly extending edge 82 is useful for removing excess paint and water from a paintbrush. A paintbrush is simply scraped against the upwardly extending edge 82 and paint is removed from the paintbrush by the upwardly extending edge 82. In addition, drip ledge groove 80 also may include a second upwardly extending edge 86. In this embodiment, second upwardly extending edge 86 abruptly transitions to downwardly extending portion 88 of tray 20. The second upwardly extending edge 86 is also useful for removing excess paint and water from a paintbrush. A lower trough 84 is positioned between first upwardly extending edge 82 and second upwardly extending edge 86 where it serves to hold water and/or paint removed from a paintbrush by first or second upwardly extending edges 82, 86. As noted above, lower trough 84 may be downwardly sloped to allow for lower trough 84 to channel water and/or paint to one or more of the plurality of recessed wells positioned in the tray to drain the lower trough 84 of drip ledge groove 80. The drip ledge groove 80 may have other configurations and geometries as well.

Figure 8:
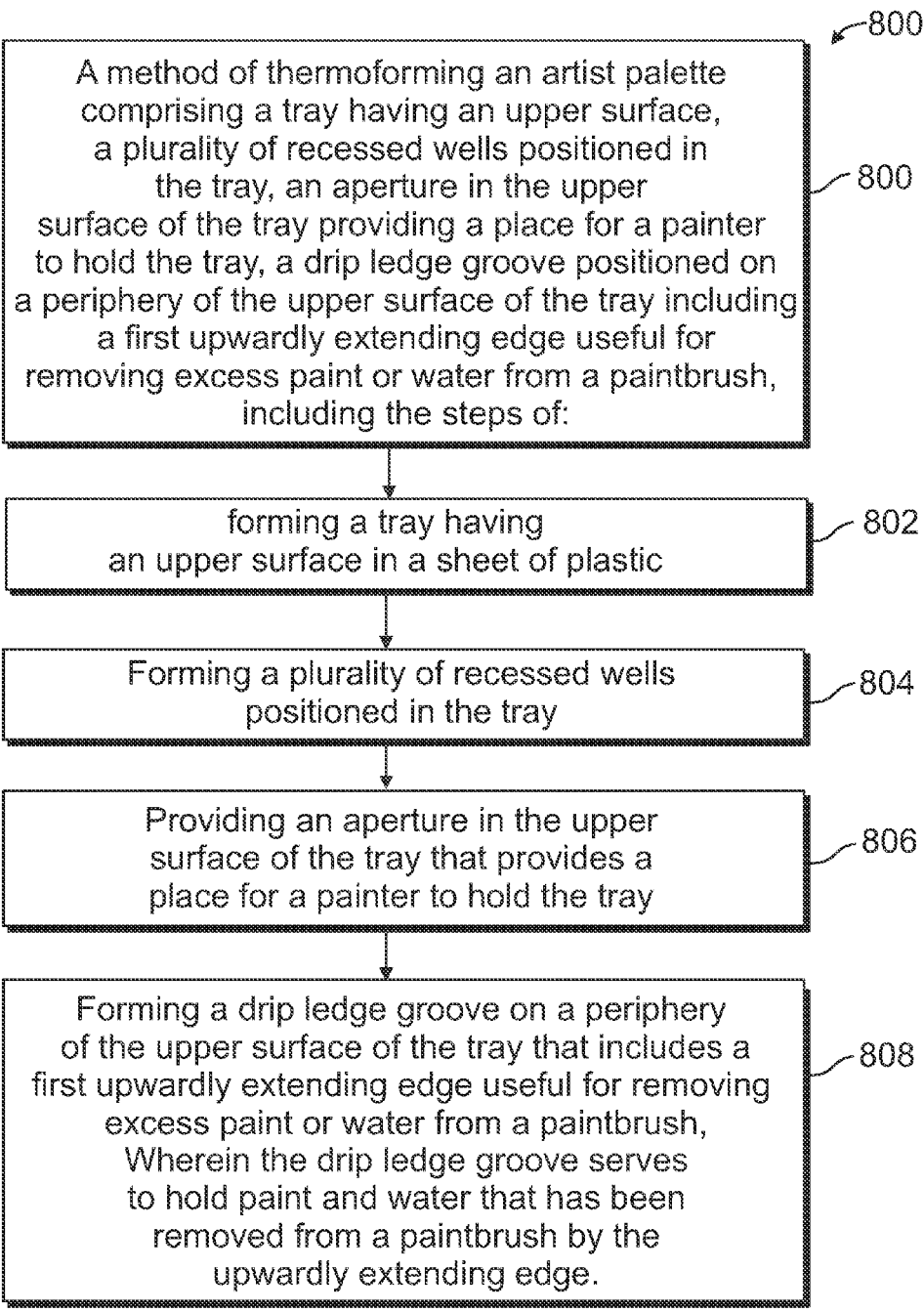
FIG. 8 is an example method 800.

FIG. 8 is directed to a method 800 of thermoforming an artist palette having comprising a tray having an upper surface, a plurality of recessed wells positioned in the tray, an aperture in the upper surface of the tray providing a place for a painter to hold the tray, a drip ledge groove positioned on a periphery of the upper surface of the tray including a first upwardly extending edge useful for removing excess paint or water from a paintbrush. The method 800 includes the step 802 of forming a tray having an upper surface in a sheet of plastic; the step 804 of forming a plurality of recessed wells positioned in the tray; step 806 of providing an aperture in the upper surface of the tray that provides a place for a painter to hold the tray; and the step 808 of forming a drip ledge groove on a periphery of the upper surface of the tray that includes a first upwardly extending edge useful for removing excess paint or water from a paintbrush, wherein the drip ledge groove serves to hold paint and water that has been removed from the paintbrush.

Method 800 may further optionally include the step of cutting one or more slots in the upper surface of the tray adapted to hold a paintbrush.

Example embodiments have been described above. Those skilled in the art will understand that changes and modifications may be made to the described embodiments without departing from the true scope of the present invention, which is defined by the claims.

We claim:
1. An artist palette, comprising:
a tray having an upper surface;
a plurality of recessed wells positioned in the tray;
an aperture in an edge of the upper surface of the tray providing a place for a painter to hold the tray;
one or more slots positioned in the tray adapted to hold a paintbrush; and
a drip ledge groove positioned on a periphery of the upper surface of the tray including a first upwardly extending edge useful for removing excess paint and water from a paintbrush;
wherein the first upwardly extending edge of the drip ledge groove extends downwardly to form a first side of the drip ledge groove and a second upwardly extending edge located inwardly from the first upwardly extending edge of the drip ledge groove to form a second side of the drip ledge groove; and
wherein the first upwardly extending edge extends upwardly a distance that is further than a distance the second upwardly extending edge extends upwardly.

2. The artist palette of claim 1, wherein the drip ledge groove includes a rounded trough positioned inwardly from the first upwardly extending edge.

3. The artist palette of claim 1, wherein the first upwardly extending edge extends vertically.

4. The artist palette of claim 1, wherein the second upwardly extending edge ends in an abrupt transition to a downwardly sloping section of the upper surface of the tray.

5. The artist palette of claim 4, wherein the drip ledge groove has a lower trough positioned between the first upwardly extending edge and the second upwardly extending edge.

6. The art palette of claim 1, wherein the drip ledge groove downwardly slopes from a first downwardly sloping wall of the upper surface of the tray and extends to one of the plurality of recessed wells to allow water and paint to drain into the one of the plurality of recessed wells.

7. An artist palette, comprising:
a tray having an upper surface;
a plurality of recessed wells positioned in the tray;
an aperture in the upper surface of the tray providing a place for a painter to hold the tray;
a drip ledge groove positioned on a periphery of the upper surface of the tray including a first upwardly extending edge useful for removing excess paint or water from a paintbrush;
wherein the drip ledge groove serves to hold paint or water that has been removed from the paintbrush;
wherein the first upwardly extending edge of the drip ledge groove extends downwardly to form a first side of the drip ledge groove and a second upwardly extending edge located inwardly from the first upwardly extending edge of the drip ledge groove to form a second side of the drip ledge groove; and wherein the first upwardly extending edge extends upwardly a distance that is further than a distance the second upwardly extending edge extends upwardly.

8. The artist palette of claim 7, wherein the drip ledge groove includes a rounded trough positioned inwardly from the first upwardly extending edge.

9. The artist palette of claim 7, wherein the first upwardly extending edge extends vertically.

10. The artist palette of claim 9, wherein one or more slots are positioned in the tray adapted to hold a paintbrush, and the one or more slots positioned in the tray each comprise a pair of intersecting slits.

11. The artist palette of claim 7, wherein the second upwardly extending edge ends in an abrupt transition to a downwardly sloping section of the upper surface of the tray.

12. The artist palette of claim 11, wherein the drip ledge groove has a lower trough that is positioned between the first upwardly extending edge and the second upwardly extending edge.

13. The artist palette of claim 11, wherein the drip ledge groove downwardly slopes from a first downwardly sloping wall of the upper surface of the tray and extends to one of the plurality of recessed wells to allow water and paint to drain into the one of the plurality of recessed wells.

14. The artist palette of claim 11, wherein the artist palette further includes a lid that mates with the drip ledge groove.

15. The artist palette of claim 7, wherein the plurality of recessed wells in the tray are nestable within a plurality of recessed wells in an additional artist palette constructed in accordance with claim 7.

16. The artist palette of claim 7, wherein the artist palette is constructed as a single, integral unit.

17. The artist palette of claim 7, wherein the first upwardly extending edge has an exposed end that is positioned at an outer edge of the tray.

18. A method of thermoforming an artist palette comprising a tray having an upper surface, a plurality of recessed wells positioned in the tray, an aperture in the upper surface of the tray providing a place for a painter to hold the tray, a drip ledge groove positioned on a periphery of upper surface of the tray including a first upwardly extending edge useful for removing excess paint or water from a paintbrush including the steps of:

forming a tray having an upper surface in a sheet of plastic;

forming a plurality of recessed wells positioned in the tray;

providing an aperture in the upper surface of the tray that provides a place for a painter to hold the tray;

forming a drip ledge groove on a periphery of the upper surface of the tray that includes a first upwardly extending edge useful for removing excess paint or water from a paintbrush;

wherein the first upwardly extending edge of the drip ledge groove extends downwardly to form a first side of the drip ledge groove and a second upwardly extending edge located inwardly from the first upwardly extending edge of the drip ledge groove to form a second side of the drip ledge groove;

wherein the first upwardly extending edge extends upwardly a distance that is further than a distance the second upwardly extending edge extends upwardly; and wherein the drip ledge groove serves to hold paint and water that has been removed from the paintbrush.

19. The method of claim 18, further including the step of cutting one or more slots in the surface of the tray adapted to hold a paintbrush.

* * * * *